US012458977B2

(12) United States Patent
Reuschel et al.

(10) Patent No.: US 12,458,977 B2
(45) Date of Patent: Nov. 4, 2025

(54) CUTTING RING FOR SOLIDS-LOADED FLUID OF A PUMP

(71) Applicant: WILO SE, Dortmund (DE)

(72) Inventors: Johannes Reuschel, Dortmund (DE); Benjamin Wegner, Dortmund (DE); Andreas Zeiss, Dortmund (DE); Thomas Keil, Dortmund (DE)

(73) Assignee: WILO SE, Dortmund (DE)

( * ) Notice: Subject to any disclaimer, the term of this patent is extended or adjusted under 35 U.S.C. 154(b) by 0 days.

(21) Appl. No.: 18/422,900

(22) Filed: Jan. 25, 2024

(65) Prior Publication Data

US 2024/0157370 A1 May 16, 2024

Related U.S. Application Data

(62) Division of application No. 17/960,034, filed on Oct. 4, 2022, now Pat. No. 12,083,527.

(51) Int. Cl.
*B02C 18/18* (2006.01)
*B02C 23/36* (2006.01)
(Continued)

(52) U.S. Cl.
CPC .............. *B02C 18/18* (2013.01); *B02C 23/36* (2013.01); *F04D 29/708* (2013.01)

(58) Field of Classification Search
CPC ....... B02C 18/18; B02C 23/36; F04D 29/708; F04D 29/2288; F04D 7/045
See application file for complete search history.

(56) References Cited

U.S. PATENT DOCUMENTS 4,640,666 A 2/1987 Sodergard
7,841,550 B1 11/2010 Dorsch
(Continued)

FOREIGN PATENT DOCUMENTS

CN 101076668 B 11/2007
CN 101541433 A 9/2009
(Continued)

OTHER PUBLICATIONS

English translate (KR101620084B1), retrieved date Sep. 13, 2024.*
(Continued)

*Primary Examiner* — Mohammed S. Alawadi
(74) *Attorney, Agent, or Firm* — Dority & Manning, P.A.

(57) ABSTRACT

Subject matter of the invention is a cutting ring for solids-loaded fluid of a pump, comprising a cutting ring base body forming an opening for cooperation with a cutting head, which cutting ring can be stationarily connected to the pump in an axial extension of an impeller of the pump, wherein a plurality of cutting teeth comprising respectively at least outer cutting edges oriented away from the impeller in the direction of a suction side of the pump are provided at the cutting ring base body around the opening, wherein the cutting teeth extend axially away from the cutting ring base body outwardly at least in the direction of the suction side, and at least in the outwardly extending cutting teeth a respective radially outwardly extending material recess is formed, and/or a radially outwardly extending axial depression is formed in the cutting ring base body in a valley between two at least outwardly extending cutting teeth.

9 Claims, 4 Drawing Sheets

(51) Int. Cl.

| | |
|---|---|
| ***F04D 7/04*** | (2006.01) |
| ***F04D 29/22*** | (2006.01) |
| ***F04D 29/70*** | (2006.01) |

(56) References Cited

U.S. PATENT DOCUMENTS

| | | | |
|---|---|---|---|
| 2004/0195410 A1 | 10/2004 | Eno et al. | |
| 2014/0119975 A1 | 5/2014 | Øvsthus et al. | |
| 2016/0363123 A1 | 12/2016 | Davis | |
| 2019/0321828 A1 * | 10/2019 | Bäcke | F04D 29/406 |

FOREIGN PATENT DOCUMENTS

| | | | |
|---|---|---|---|
| CN | 208236728 U | | 12/2018 |
| CN | 109869317 A | | 6/2019 |
| CN | 210715160 U | | 6/2020 |
| CN | 211397921 U | | 9/2020 |
| EP | 0120178 A1 | | 10/1984 |
| EP | 1344944 B1 | | 9/2003 |
| KR | 100722507 B1 | | 5/2007 |
| KR | 101620084 B1 | * | 5/2016 |
| WO | WO 2012/173488 A1 | | 12/2012 |

OTHER PUBLICATIONS

Korean Office Action (w/ English translation) for corresponding Application No. 10-2022-0136019, dated May 7, 2024, 8 pages.
Chinese Office Action (w/ English translation) for corresponding Application No. 2022107165353, dated Apr. 24, 2024, 11 pages.
Luxembourg Office Action for corresponding Application No. LU102842, dated Apr. 13, 2022, 9 pages.
Office Action (w/ English translation) in corresponding CN Application No. 202210715361.9, dated Jul. 1, 2025, in 10 pgs.

* cited by examiner

CUTTING RING FOR SOLIDS-LOADED FLUID OF A PUMP

CROSS-REFERENCE TO RELATED APPLICATIONS

This application is a division of and claims the right of priority to U.S. patent application Ser. No. 17/960,034, filed Oct. 4, 2022, the disclosure of which is hereby incorporated by reference herein in its entirety for all purposes.

TECHNICAL FIELD

The invention relates to a cutting ring for solids-loaded fluid of a pump, comprising a cutting ring base body forming an opening for cooperation with a cutting head, which cutting ring can be stationary connected to the pump in an axial extension of an impeller of the pump, wherein a plurality of cutting teeth with respective at least outer cutting edges oriented in the direction of a suction side of the pump away from the impeller are provided at the cutting ring around the opening, and wherein the cutting teeth extend axially outwardly away from the cutting ring base body at least in the direction of the suction side.

BACKGROUND OF THE INVENTION

Admixtures of solids in fluids such as wastewater can clog pumps or pipelines. In order to prevent such clogging, so-called cutting units are used, which are located upstream of a suction area of the pumps in order to chop the solids contained in the fluid.

Cutting units known from the prior art often have a fixed part, called cutting surface or cutting element, and a rotating part, called cutting head. Depending on the area of application of the cutting unit, circular, conical or cylindrical cutting surfaces can be used. The cutting surfaces, also called cutting screen, have openings through which the fluid flows toward an impeller of the pump. If the cutting surface is designed flat or conical, it is referred to as a cutting plate. A cylindrical design of the cutting surface is called a cutting ring.

While the cutting action of such cutting units is good, at least in an as-new condition, the cutting units themselves can become clogged, blocked by solids, or solids can build up in front of the suction area of the pump and thus block the suction area. In addition, a cutting unit disposed upstream of the pump usually has a negative effect on the efficiency and characteristics of the pump due to the influence of the inflow into the pump.

DESCRIPTION OF THE INVENTION

Based on this situation, it is an object of the present invention to provide a cutting ring for solids-loaded fluid of a pump which, compared to solutions known from the prior art, is more reliable in operation, reduces a maintenance requirement and at the same time enables a high hydraulic efficiency of the pump.

Accordingly, the object is achieved by a cutting ring for solids-loaded fluid of a pump, comprising a cutting ring base body forming an opening for cooperation with a cutting head, which cutting ring can be stationary connected to the pump in an axial extension of an impeller of the pump, wherein a plurality of cutting teeth comprising respective, preferably inner cutting edges oriented axially in the direction of the impeller and at least outer cutting edges oriented in the direction of a suction side of the pump away from the impeller are provided at the cutting ring base body around the opening, wherein the cutting teeth extend axially away from the cutting ring base body preferably partly inwards in the direction of the impeller and partly at least outwards in the direction of the suction side, and at least in the outwardly extending cutting teeth a respective radially outwardly extending material recess is provided, and/or in a valley between two at least outwardly extending cutting teeth, a radially outwardly extending axial depression is provided in the cutting ring base body.

An essential point of the proposed solution is to provide a material recess extending radially outward and/or to provide an axial depression extending radially outward. Due to these measures, solids that may possibly adhere to the outer diameter of the cutting head and rotate along with it during operation experience a cutting action in any axial plane of the cutting unit formed by the cutting head and cutting ring. In particular, the material recess reduces the cutting area, which reduces friction, so that less torque is required and the pump can be operated more reliably both during start-up and during regular operation. This penetration of the cutting edges is in particular achieved by the outwardly extending axial depression, which preferably has a pocket-like design and extends radially outwards into the cutting ring base body. The pockets are preferably respectively formed between the cutting teeth and in the form of axial depressions. In operation, the cutting edges of the rotating cutting head can thus sweep past the cutting edges of the stationary cutting ring at a cylindrical circumferential surface. In summary, the proposed cutting ring achieves a better and unobstructed inflow to the pump inlet and a higher filtration efficiency.

A pump is generally defined as a fluid-flow machine that uses a rotational motion and dynamic forces to convey predominantly fluids as a medium. Preferably, the pump is designed as a rotary pump. In a rotary pump, in addition to a tangential acceleration of the fluid, the medium, centrifugal force occurring in radial flow is used for pumping, so that such pumps are also referred to as centrifugal pumps. Preferably, the pump can be used for a hydraulic system of a building, for example, as a sewage pump.

In regular operation of the pump, a housing of a motor of the pump may be arranged above a pump housing in which the impeller driven by the motor via the motor shaft is provided for conveying the fluid, wherein the housing of the motor may be stationarily connected to the pump housing and/or formed in one piece therewith. Preferably, the motor shaft protrudes from the housing of the motor into the pump housing at a drive side and/or the impeller is stationarily connected to the motor shaft at the drive side.

Preferably, the fluid comprises water or another fluid medium such as wastewater. The fluid may include solids such as contaminants of any kind, in particular fecal matter, sediments, dirt, sand, or even smaller pieces of wood, brushwood, textiles, rags or the like. Preferably, the housing of the motor and/or the pump housing is made of metal, in particular of cast iron or contour stainless steel, and/or of plastic.

Preferably, the cutting ring base body is preferably configured ring-shaped and/or made of metal, in particular from a hard metal. The cutting head can be inserted into the in particular circular opening, so that by rotating the cutting head, cutting head cutting edges can cooperate with cutting edges of the cutting ring for chopping the solid material. Preferably, the plurality of cutting teeth are provided with respective inner cutting edges oriented axially toward the impeller and/or outer cutting edges oriented toward the suction side of the pump away from the impeller, wherein the cutting teeth extending axially away from the cutting ring base body partly inward toward the impeller and partly outward toward the suction side. The cutting teeth are preferably grouped around the opening in a cylinder-like manner. The material recess and/or the depression can be incorporated subsequently, for example by milling, or can already be introduced during the manufacture of the cutting ring, for example by means of a suitably designed casting mold. Preferably, an inner diameter in the area of the material recess is larger than in the area where no material recess is provided. The cutting edges are preferably free of the material recess. Further preferably, a contour of the material recess follows in particular parallel to a contour of the cutting edge. This results in a uniformly wide and thus also uniformly stable cutting surface. Furthermore, at the inside of the cutting ring a cutting ring collar can be provided, which merges from the cutting ring base body, tapering axially, into the inner cutting teeth. Preferably, a material recess extending radially outward is provided in all cutting teeth, and/or an axial depression extending radially outward is provided in each of the valleys.

According to a preferred further development, the cutting ring comprises the material recess, wherein the material recess is provided behind the cutting edge in the direction of rotation of the impeller. Preferably, the cutting edge is formed without a material recess and is thus accordingly stable and resistant even with regard to larger solids. On the other hand, the material recess in the area of the cutting tooth behind the cutting edge in the direction of rotation allows the cutting tooth to be optimized in terms of material and thus to be designed cost-effectively.

According to another advantageous further development, inner and outer cutting teeth are provided and the outer cutting edge of a valley between two outwardly extending cutting teeth and the inner cutting edge of a valley between two inwardly extending cutting teeth overlap axially. In such an embodiment, no radially circumferential collar is formed on a cutting surface of the cutting ring formed by the cutting edges, which is not interrupted by a cutting edge. Solids which adhere to the outer diameter of the cutting head and rotate therewith during operation are thus subjected to a cutting action in any axial plane of the cutting unit formed by the cutting ring and cutting head.

According to another preferred further development, inner and outer cutting teeth are provided and the inner and outer cutting edges extend axially in a wave-like or sinusoidal manner around the opening and/or the cutting ring base body is flattened radially outward in the valley. For this purpose, the inner and outer cutting edges preferably respectively extend inwards and outwards in the direction of the normal of the cutting ring base body. Preferably, each valley corresponds axially to a cutting tooth and/or a recess provided oppositely at the cutting ring body, so that, for example, a valley and/or a recess is provided at the inside of the cutting ring body and a cutting tooth extends at the outside. Preferably, the cutting ring base body is flattened radially outward at the side in the valley at which the valley is enclosed between two adjacent cutting teeth.

According to another advantageous further development, inner and outer cutting teeth are provided and the inner cutting edge and the outer cutting edge are respectively formed around the opening in axial extension between a tip of an outer cutting tooth and a tip of an inner cutting tooth. The opening may be circumferentially enclosed by a cutting edge. Preferably, the inner cutting teeth extend axially to a position above a cylindrical collar on the cutting head when installed.

According to another preferred further development, in the direction of rotation of the impeller, a slope of the cutting edge flattens outwardly from the cutting ring base body towards a tip of the cutting tooth. In other words, outer cutting teeth are in particular preferably designed in such a way that the cutting angle steadily becomes flatter towards the outside. Coarse solids thus experience a certain cutting effect at the end of the teeth, but can slide off again unhindered. Smaller or sufficiently pre-chopped solids, on the other hand, penetrate deeper into the cutting unit formed by the cutting ring and the cutting head and are reliably chopped by the steepening cutting angle and pass through the cutting unit in the direction of the impeller. Inner and outer cutting teeth can have the same or different cutting angles.

According to another advantageous further development, inner and outer cutting teeth are provided and two, three, four, six or eight cutting teeth are provided which are alternately oriented outwardly and inwardly. Likewise, more cutting teeth may be provided. Preferably, the number of outwardly oriented cutting teeth corresponds to the number of cutting segments of the cutting unit extending in this area, although other ratios are also possible.

According to another preferred further development, the cutting ring base body is configured disk-shaped and the cutting teeth extend axially away from the base surface. Preferably, the cutting ring is made of a metal, in particular a hard metal. The cutting edges can be configured reinforced. It is also conceivable that the cutting edges and/or the cutting teeth are designed to be replaceable so that they can be replaced after wear thereof.

According to another advantageous further development, the slope of the cutting edge in the direction of rotation of the impeller is steeper than the slope opposite to the direction of rotation, so that the slope of the cutting edge that interacts with the cutting head is flatter. In the direction of rotation of the impeller, the slope of the cutting edge is preferably 20° on the outside and 10° on the inside. The slope and the cutting angle of the outer cutting edges opposite to the direction of rotation, i.e. at the side cooperating with the cutting head, is preferably 55°, while the cutting angle of the inner cutting edges, in contrast, is preferably 52.5°. In a radial side view, each cutting tooth is thus preferably triangular in shape. Preferably, each cutting tooth projects at least 17 mm outward. The cutting teeth can further be radially 'sharpened', for example flattened outwardly at 37° and inwardly at 33° relative to the disk-shaped cutting ring base body toward the opening. According to another preferred further development, the inner cutting tooth extends axially away from the cutting ring base body further than the outer cutting tooth.

The object of the invention is further achieved by a pump comprising a cutting ring as described above and a cutting head connected to the impeller in a torque-proof manner and comprising a plurality of cutting head cutting teeth which cooperate with the cutting edges for chopping the grasped solids.

Such a pump allows a better inflow in the inlet area of the impeller, resulting in a higher pump characteristic, since compared to designs known from the prior art a disturbance of the inflow between the blades or the blade channels formed thereby is reduced. Due to the proposed cutting ring, solids that adhere to the outer diameter of the cutting head and rotate therewith during operation experience a cutting action in any axial plane of the cutting unit, so that a better cutting result and a reduced risk of clogging are achieved.

BRIEF DESCRIPTION OF THE DRAWINGS

In the following, the invention is explained in more detail with reference to the accompanying drawings based on preferred exemplary embodiments.

In the drawings.

DETAILED DESCRIPTION OF THE EXEMPLARY EMBODIMENTS

Figure 1:
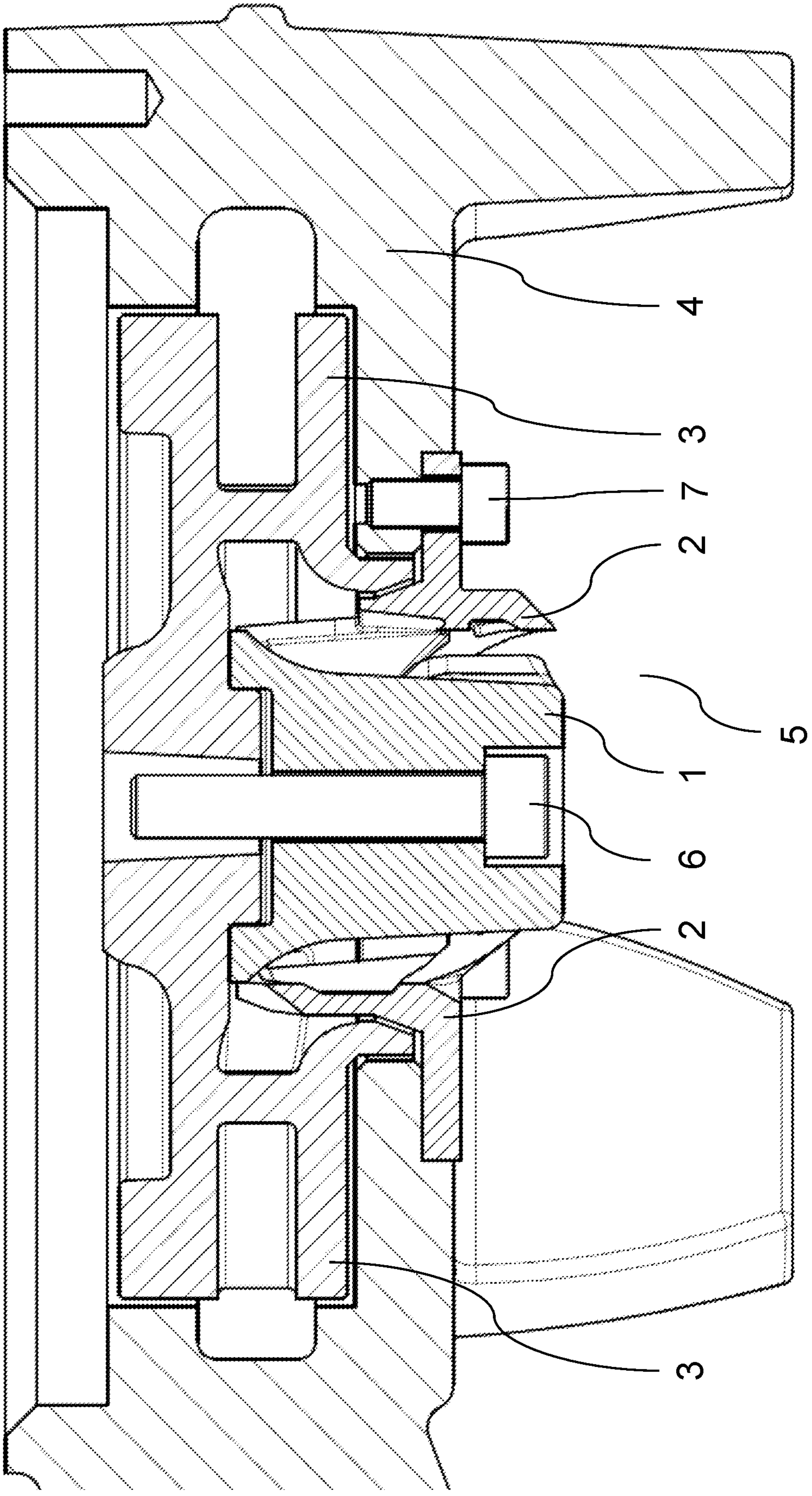
FIG. 1 shows a pump in a partial sectional view according to a preferred exemplary embodiment of the invention.
Figure 2:
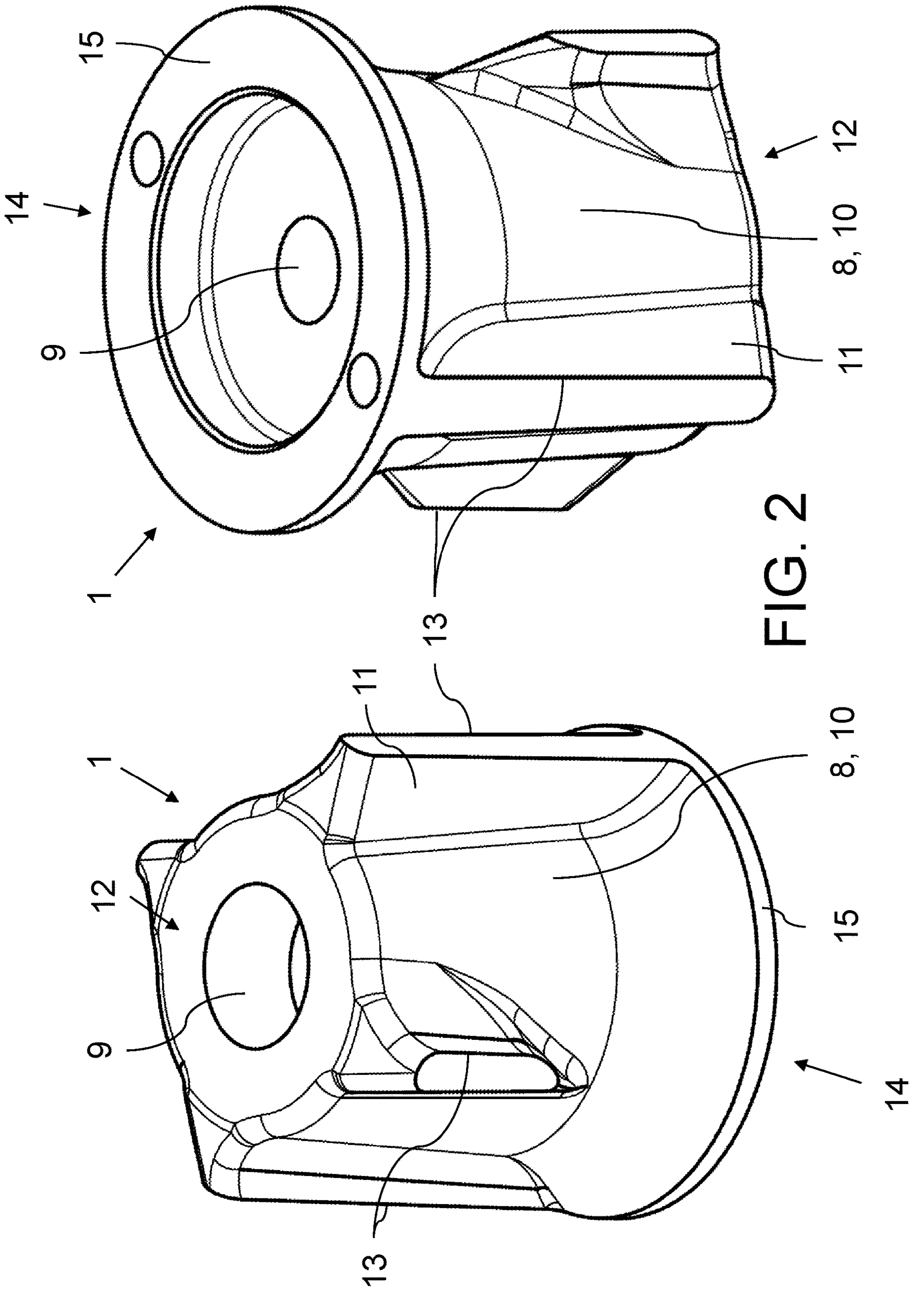
FIG. 2 shows a cutting head of the pump in two perspective views according to the preferred exemplary embodiment of the invention.
Figure 3:
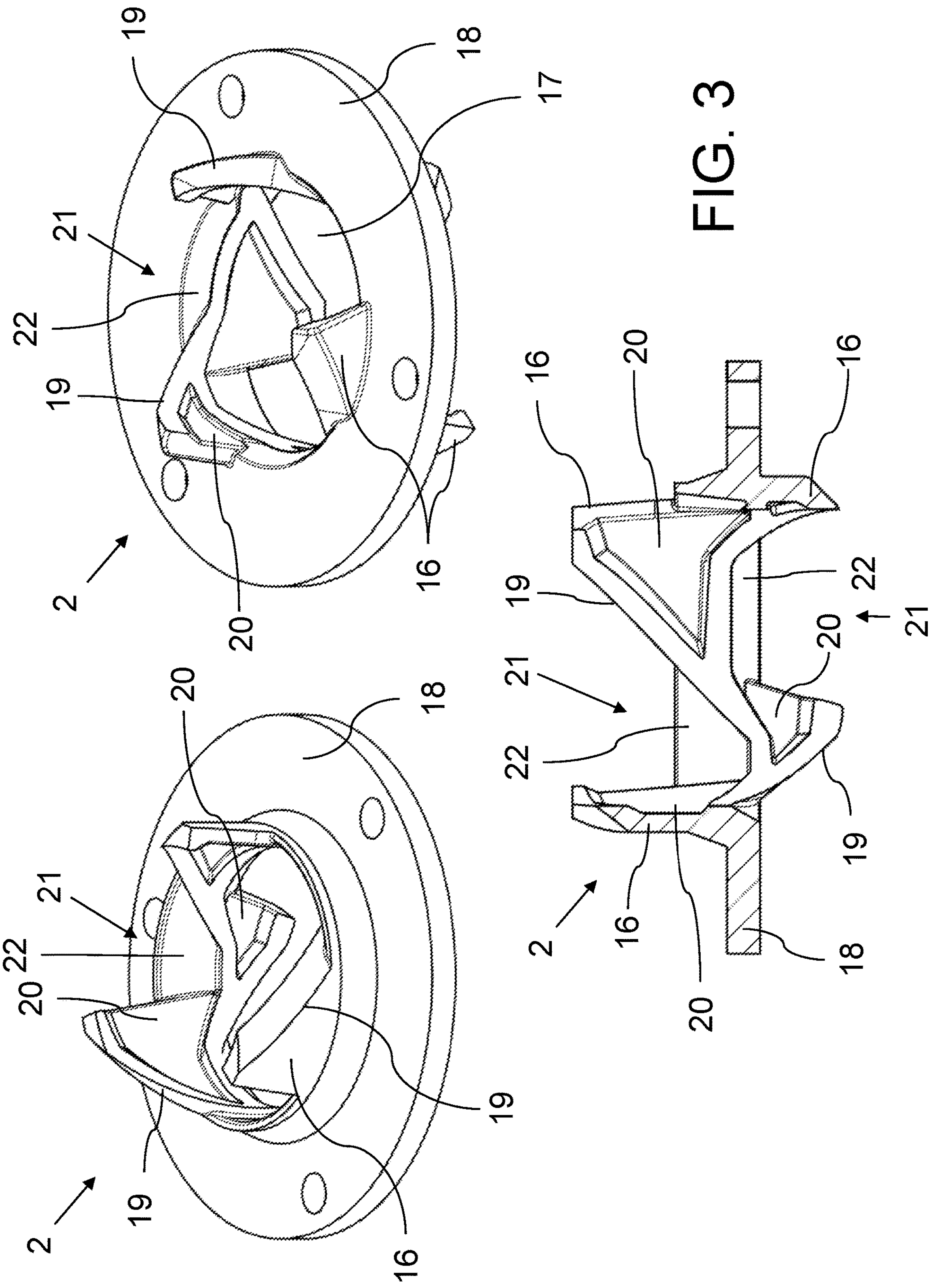
FIG. 3 shows a cutting ring of the pump in two perspective views (top) and in a sectional view (bottom) according to the preferred exemplary embodiment of the invention.
Figure 4:
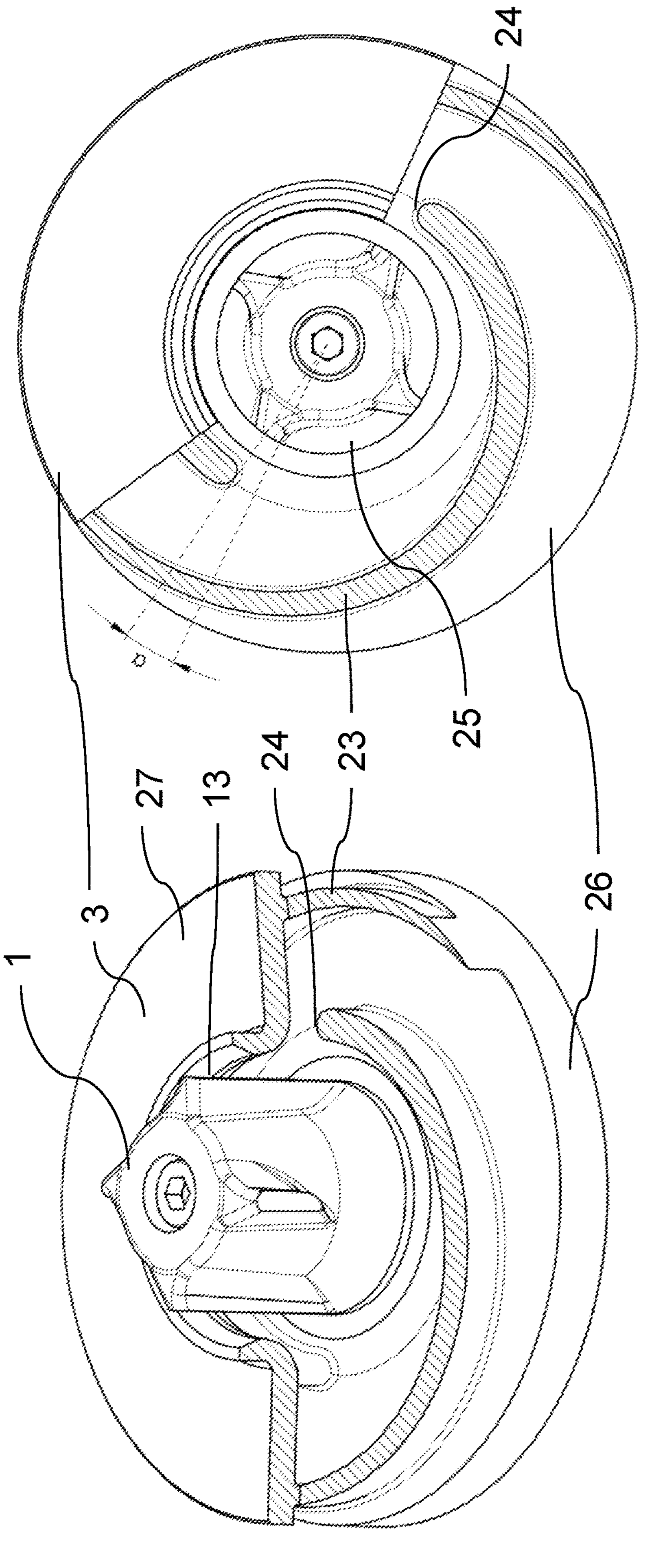
FIG. 4 shows an impeller and the cutting head of the pump in a perspective view (left) and in a top view (right) according to the preferred exemplary embodiment of the invention.

FIG. 1 shows a pump in a partial sectional view according to a preferred exemplary embodiment of the invention. The pump, designed as a submersible sewage pump, comprises a cutting unit upstream of an impeller 3 comprising a cutting head 1 and a cutting ring 2, which are shown in FIGS. 2 to 4. Cutting head 1, cutting ring 2 and impeller 3 of the pump do not necessarily have to be designed as described below. This means, for example, that the pump can have the cutting head 1 described below, but the cutting ring 2 and impeller 3 can be designed differently than described below. The same applies to the cutting ring 2 and the impeller 3. In this respect, if, for example, the cutting ring 2 is designed as described below, the cutting head 1 does not have to be designed as described below, although this is possible.

The partial sectional view of FIG. 1 shows a part of a pump housing 4 of the pump, above which in regular operation of the pump a housing, not shown, is provided for a motor of the pump. The motor drives the impeller 3 via a motor shaft, not shown, wherein the impeller can suck in solids-loaded fluid from a suction side 5 formed below the pump housing 4. In this respect, the terms axial and radial used in the following refer to the axial extension of the motor shaft.

The cutting head 1 is stationarily, in particular force- and/or form-fittingly, connected to the impeller 3 by means of a cutting head screw 6 and rotates accordingly along with the impeller 3 during operation of the pump. In contrast, the cylindrical cutting ring 2 enclosing the cutting head 1 is stationarily connected to the pump housing 4 by means of a plurality of cutting ring screws 7. A radial seal is provided between the cutting ring 2 and the impeller 3. The cutting head 1 protrudes into the suction side 5, so that fluid sucked in from the suction side 5 first flows through a gap provided between the cutting head 1 and cutting ring 2, and is then conveyed through the impeller 3. The rotational movement of the cutting head 1 relative to the cutting ring 2 causes solids contained in the fluid to be chopped before they reach the impeller 3.

FIG. 2 shows the cutting head 1 of the pump in two perspective views according to the preferred exemplary embodiment of the invention. On the left, the cutting head 1 is shown in a perspective plan view from side associated with the suction side 5, while on the right, the cutting head 1 is shown in a perspective plan view from the side associated with the impeller 3. The cutting head 1 has a cylinder-like, rotationally symmetrical cutting head base body 8 made of metal, through which a bore 9 extends axially for receiving the cutting head screw 6 for attachment to the impeller 3.

Four cutting segments 11 formed integrally with the cutting head base body 8 are arranged at regular intervals are provided on the circumferential surface 10 of the cutting head base body 8. The cutting segments 11 respectively extend radially away from the cutting head base body 8. Furthermore, all cutting head base bodies 8 extend axially in the direction of the impeller 3 from a fluid inlet side 12 of the cutting head 1 facing the suction side 5 opposite the impeller 3 and thus form axially extending cutting head cutting edges 13.

Whereas the cutting segments 11 or their cutting head cutting edges 13 arranged 180° opposite each other on the left and right in the left figure extend axially over the same length, i.e. from the fluid inlet side 12 of the cutting head 1 facing the suction side 5 to essentially the opposite side 14 facing the impeller 3, the two cutting segments 11 or their cutting head cutting edges 13 arranged at a distance of 90° in between extend axially from the fluid inlet side 12 not up to the side 14. In other words, two cutting head cutting edges 13 respectively have an axial extension of different lengths with respect to the other two cutting head cutting edges 13, since a first part of the cutting head cutting edges 13 extends from the fluid inlet side 14 substantially or completely over the entire axial extension of the cutting head 1 and a second part of the cutting head cutting edges 13 extends from the fluid inlet side 14 over only a part of the entire axial extension of the cutting head 1.

In still other words, the second part of the cutting segments 11 is shortened by about one half with respect to the first part, wherein the cutting segments 11 arranged opposite each other are respectively of identical design. The shortened part of the cutting segments 11 of the axial extension is designed free of cutting head cutting edges 13. The shortened cutting segments 11 have a constant radial diameter up to about half of the axial extension of the cutting head 1 and then taper in diameter drop-shaped towards the side 14 facing the impeller 3. On its side 14 axially facing the impeller 3, the cutting head 1 has a circumferential cylindrical collar 15, which is made in one piece with the cutting head base body 8 and is flush with the cutting head cutting edges 13 with regard to its radial outer diameter. The collar 15 tapers in diameter from the side 14 in the direction of the fluid inlet side 12 and uniformly merges into the cutting head base body 8.

Facing the direction of rotation of the cutting head 1, the cutting segments 11 extend concavely radially away from the cutting head body 8 towards the respective cutting head cutting edge 13. In contrast, facing away from the direction of rotation of the cutting head 1, the cutting segments 11 extend linearly radially away from the cutting head body 8 towards the cutting head cutting edge 13. The same applies to the teardrop-shaped taper of the shortened cutting segments 11.

For further flow optimization, the cutting segments 11 and the cutting head cutting edges 13 are beveled at the fluid inlet side 12 of the cutting head 1 opposite to the impeller 3, as can be seen from FIG. 2. For chopping the grasped solid, the above-described cutting head 1 with its cutting head cutting edges 13 can cooperate with the cutting ring 2 provided stationarily at the pump and comprising a plurality of cutting teeth 16 as described below.

FIG. 3 shows a cutting ring 2 of the pump in two perspective views (top) and in a sectional view (bottom) according to the preferred exemplary embodiment of the invention. The cutting ring 2 comprises a ring-like cutting ring base body 18 forming an opening 17. In the installed state shown in FIG. 1, the cutting head 1 is passed through the opening 17. As previously described, the cutting ring 2 is fixed in place to the pump housing 4 of the pump by means of three cutting ring screws 7 grouped around the opening 17 in the axial extension of the impeller 3.

A plurality of cutting teeth 16 with respective inner cutting edges 19 oriented axially in the direction of the impeller 3 and outer cutting edges 19 oriented in the direction of the suction side 5 of the pump away from the impeller 3 are provided at regular intervals at the rotationally symmetrical cutting ring base body 18 around the opening 17, wherein the cutting edges 19 interact with the cutting head cutting edges 13 of the cutting head 1 when the latter is rotated.

Three cutting teeth 16 each extend axially away from the cutting ring base body 18 in the direction of the impeller 3 inwardly into the pump housing 4, and three cutting teeth 16 each extend in the direction of the suction side 5 outwardly out of the pump housing 4, as also indicated in FIG. 1. Similarly, four, eight, twelve or more cutting teeth 16 may be provided, which are oriented alternately outwardly and inwardly. In axial extension, an inner cutting edge 19 and an outer cutting edge 17 are formed respectively between a tip of an outer cutting tooth 16 and a tip of an inner cutting tooth 16 around the opening 17.

The outwardly extending cutting teeth 16 are shown below the disk-shaped cutting ring base body 18 in the sectional view below in FIG. 3, while the inwardly extending cutting teeth 16 are shown above the cutting ring base body 18 in the sectional view. The perspective illustration at the top right in FIG. 3 corresponds to this illustration and shows the view onto the cutting ring 2 as seen from the suction side 5, while the perspective illustration at the top left shows the view onto the cutting ring 2 as seen from the pump housing 4.

At least in each of the outwardly extending cutting teeth 16, a radially outwardly extending material recess 20 is provided behind the cutting edge 19 in the direction of rotation of the impeller 4. Such a material recess 20 is also provided in the inwardly extending cutting teeth 16. This means that the outer diameter of the cutting teeth 16 extending annularly around the opening 17 in a wave-like or sinusoidal manner in plan view is the same, while the inner diameter in the region of the material recess 20 is enlarged with respect to a region of the cutting teeth 16 without material recess.

Alternatively or additionally, in a valley 21 between at least two outwardly extending cutting teeth 16, a radially outwardly extending pocket-like axial depression 22 is formed in the cutting ring base body 18. In the present case, pocket-like axial depressions 22 are formed both in the valleys 21 between the outwardly extending and the inwardly extending cutting teeth 16. The depressions 22 extend radially outwardly from the valley bottom while getting deeper, so that the cutting ring base body 18 is flattened radially outwardly in the valley 21. The material recesses 20 and valleys 21 are provided at all cutting teeth 16 and between them, respectively, and can be produced by milling or by a corresponding casting mold of a metallic cutting ring 2.

As can be seen in particular from the illustration below in FIG. 3, the outer cutting edge 19 of a valley 21 between two outwardly extending cutting teeth 16 and the inner cutting edge 19 of a valley 21 between two inwardly extending cutting teeth 16 overlap in the axial direction. In this way, there no radially circumferential collar is provided at a cutting surface of the cutting ring 2 formed by the cutting edges 19, which is not interrupted by a cutting edge 19. In the direction of rotation of the impeller 3, a cutting angle of the cutting edge 19 flattens outwardly from the cutting ring base body 18 toward a tip of the cutting tooth 16.

A cutting angle of the outer cutting teeth 16 or the outer cutting edges 19 facing the cutting head cutting edges 13 is 55°, whereas the cutting angle of the inner cutting teeth 16 is 52.5°. In the direction of rotation of impeller 3, the cutting angle is shallower and is 20° on the outside and 10° on the inside. Each cutting tooth 16 protrudes at least 17 mm outwardly from the cutting ring base body 18, with the inner cutting teeth 16 extend axially away from the cutting ring base body 16 to a greater extent than the outer cutting teeth 16. The cutting teeth 16 are further radially 'sharpened', namely flattened at 37° on the outside and 33° on the inside towards the opening 17 relative to the disk-like cutting ring base body 16. In addition, other cutting angles and dimensions are conceivable.

FIG. 4 shows a closed two-channel impeller 3 and the cutting head 1 of the pump in a perspective half-open view on the left and in a half-open top view on the right according to the preferred exemplary embodiment of the invention. The cutting head 1 is further stationarily connected to the impeller 3, not shown in FIG. 4, in axial extension thereof for cooperation with the cutting ring 2, also not shown in FIG. 4. The cutting head 1 is designed as described above with a cutting head base body 8 with the plurality of cutting segments 11 respectively comprising in particular axially extending cutting head cutting edges 13 for chopping the solid material, wherein cutting head cutting edges 13 extend radially away from the cutting head base body 8.

The disc-like impeller 3 comprises in accordance with common practice two blades 23 extending in a worm-like manner, each of which extends from an entry edge 24 facing the cutting head 1 at a central impeller opening 25 to the outer radial edge of the impeller, as can be seen in FIG. 4, in particular on the right. The blades 23 are axially enclosed on the one hand at the motor side by a radially extending support disk 26 comprising a hub, not shown, for receiving the motor shaft of the pump, and on the other hand at the suction side by a radially extending cover disk 27, so that the axially extending blades 23 are provided between the support disk 26 and the cover disk 27 which are arranged parallel to each other. At the radially outer edge, the impeller 3 is opened radially between the support disk 26, the cover disk 27 and two adjacent blades 23 in a rectangular manner as seen in a lateral plan view.

As can be seen in particular from FIG. 4 on the left, the cutting head cutting edges 13 are arranged spaced apart from the entry edges 24. Further, the entry edges 24 are provided spaced radially outwardly from the inner edge of the impeller opening 25. Moreover, the cutting head cutting edges 13 are arranged radially leading in the direction of rotation of the impeller 3 and, in particular, radially overlapping the entry edges 24, as indicated by the angle α in FIG. 4 on the right. In other words, the entry edges 24 of the impeller 3 and the cutting head cutting edges 13 do not lie on a radial line.

For example, the angle α is ≤2.5°, 5° or 10° and in particular α≤2.5°, 5°, 10°, 15°, 20°, 30° or 45°. The cutting head cutting edges 13 and the entry edges 24 extend parallel to each other. Radially overlapping means in particular that the entry edges are arranged at least partially at the same axial height and/or at least partially in a common radial plane as the cutting head cutting edges. Preferably, the axial extension of the cutting head cutting edges is greater than the axial extension of the entry edges.

In the present case, as previously explained, two blades 23 are provided, while the cutting head 1 passing through the impeller opening 25 comprises four cutting head cutting edges 13. Of the four cutting head cutting edges 13, however, only the cutting head cutting edges 13 of the non-shortened cutting segments 11 interact with the blades 23. In the axial direction, the shortened cutting segments 11 are provided in front of the blades 23 at the suction side, so that there is no overlap of the cutting head cutting edges 13 of the shortened cutting segments 11 with the blades 23. If, in an alternative embodiment, eight cutting segments 11 are provided, for example, the impeller 3 appropriately comprises four blades 23. For radial sealing of the impeller 3, a cylindrical sealing gap, not shown, is provided between the suction side 5 of the impeller 3 and the pump housing 4. A further sealing is formed in which the cutting ring 2 at least partially encompasses the impeller 2 to form a conical sealing gap.

The described exemplary embodiments are merely examples, which can be modified and/or supplemented in a variety of ways within the scope of the claims. Each feature that has been described for a particular exemplary embodiment can be used independently or in combination with other features in any other exemplary embodiment. Any feature that has been described for an exemplary embodiment of a particular category can also be used in a corresponding manner in an exemplary embodiment of another category.

The invention claimed is:

1. A pump for liquid loaded with solids comprising an impeller and a cutting head for interaction with a cutting ring, wherein the cutting head has a cutting head base body which is assigned to the impeller of the pump, wherein a plurality of protrusions are provided on a circumferential surface of the cutting head base body, the plurality of protrusions each have axially extending cutting head cutting edges for comminuting the solids, the plurality of protrusions each extend radially away from the cutting head base body and the plurality of protrusions each extend from a fluid inlet side of the cutting head arranged opposite the impeller axially in a direction of the impeller, the cutting head cutting edges of one of the plurality of protrusions extends from the fluid inlet side over an entire axial extension of the cutting head and the cutting head cutting edges of a second one of the plurality of protrusions extends from the fluid inlet side only over a part of the entire axial extension of the cutting head, and the second one of the plurality of protrusions tapers in another part of the axial extension towards a side of the cutting head facing the impeller.

2. The pump according to claim 1, wherein the another part of the axial direction is designed free of the cutting head cutting edges.

3. The pump according to claim 1, wherein the plurality of protrusions taper in a shape of a drop.

4. The pump according to claim 1, wherein the cutting head has a circumferential cylindrical collar on a side of the cutting head axially facing the impeller, wherein the collar is flush with the cutting head cutting edges with respect to a radial outer diameter of the collar.

5. The pump according to claim 4, wherein the collar tapers in a diameter away from a side of the collar facing the impeller and merges into the cutting head base body.

6. The pump according to claim 1, wherein the cutting head base body is a cylindrical shape, the plurality of protrusions extend radially away from the circumferential surface and the cutting head cutting edges project up to an outer diameter of the cutting head.

7. The pump according to claim 1, wherein the plurality of protrusions extend at least one of non-linearly radially away from the cutting head base body in a direction of rotation of the cutting head towards the cutting head cutting edges and linearly radially away from the cutting head base body towards the cutting head cutting edges in a direction of rotation of the cutting head away from the cutting head base body.

8. The pump according to claim 1, wherein at least one of a cutting segment of the plurality of protrusions and the cutting head cutting edges are beveled on the fluid inlet side of the cutting head opposite the impeller.

9. The pump according to claim 1, wherein the cutting ring is provided stationary on the pump and the cutting ring comprises a plurality of cutting teeth which cooperate with the cutting head cutting edges for comminuting the captured solids.

* * * * *